(12) United States Patent
Yu et al.

(10) Patent No.: US 7,949,240 B2
(45) Date of Patent: May 24, 2011

(54) PORTABLE CAMERA DEVICE

(75) Inventors: Chien-Nan Yu, Taipei (TW); Szu-Hao Lyu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 176 days.

(21) Appl. No.: 12/263,814

(22) Filed: Nov. 3, 2008

(65) Prior Publication Data

US 2010/0080543 A1 Apr. 1, 2010

(30) Foreign Application Priority Data

Sep. 26, 2008 (TW) ............................... 97137053 A (51) Int. Cl.
*G03B 15/00* (2006.01)
*F16M 11/14* (2006.01)
(52) U.S. Cl. ........................................ 396/5; 248/183.1
(58) Field of Classification Search .............. 396/5, 329, 396/419, 428, 3; 248/177.1, 178.1, 183.1, 248/660, 664, 668, 678; 352/243; 353/22, 353/24; 108/29, 50.01
See application file for complete search history.

(56) References Cited

U.S. PATENT DOCUMENTS

| | | | | |
|---|---|---|---|---|
| 5,950,017 A | * | 9/1999 | Reff | 396/419 |
| 6,798,985 B2 | * | 9/2004 | Reff | 396/14 |
| 2003/0133703 A1 | * | 7/2003 | Lin et al. | 396/3 |
| 2007/0036529 A1 | * | 2/2007 | Lam | 396/5 |

\* cited by examiner

*Primary Examiner* — Clayton E Laballe
*Assistant Examiner* — Autumn Parker
(74) *Attorney, Agent, or Firm* — Kirton & McConkie; Evan R. Witt (57) ABSTRACT

A portable camera device includes a first casing, a second casing and an extendable mechanism. The second casing contains a lens module and has a lower part connected to a first connecting position of the first casing such that the lens module is arranged above the first casing. The extendable mechanism has a rear end with a document holding structure for holding a document and a front end connected to a second connecting position of the first casing via a first pivotal mechanism. The extendable mechanism is selectively folded or unfolded with respect to the first casing when the extendable mechanism is rotated in various directions by adjusting the first pivotal mechanism. A relative spatial correlation between the lens module and the document is adjusted such that the lens module is focused on a selected area of the document for capturing an image of the document.

17 Claims, 7 Drawing Sheets

PORTABLE CAMERA DEVICE

FIELD OF THE INVENTION

The present invention relates to a portable camera device, and more particularly to a portable camera device having a document holder for holding the document to be shot.

BACKGROUND OF THE INVENTION

Recently, the applications of web cameras (PC Cam) to capture images of documents have experienced great growth and are rapidly gaining in popularity. For holding the document to be shot by the web camera, a document holder conforming to the web camera has been developed.

Figure 1A:
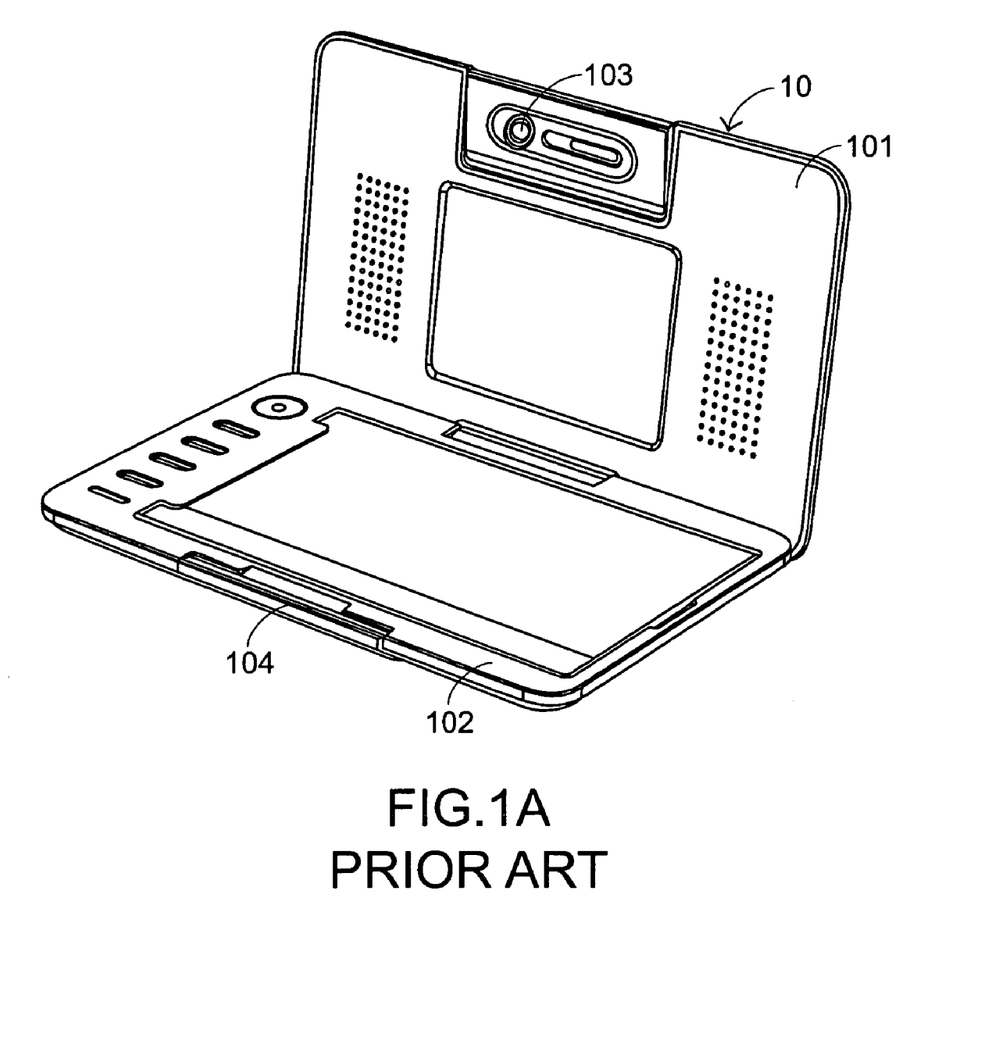
FIG. 1A is a schematic perspective view illustrating an electronic device having a business card holder according to the prior art, in which the business card holder is stored within the electronic device.
Figure 1B:
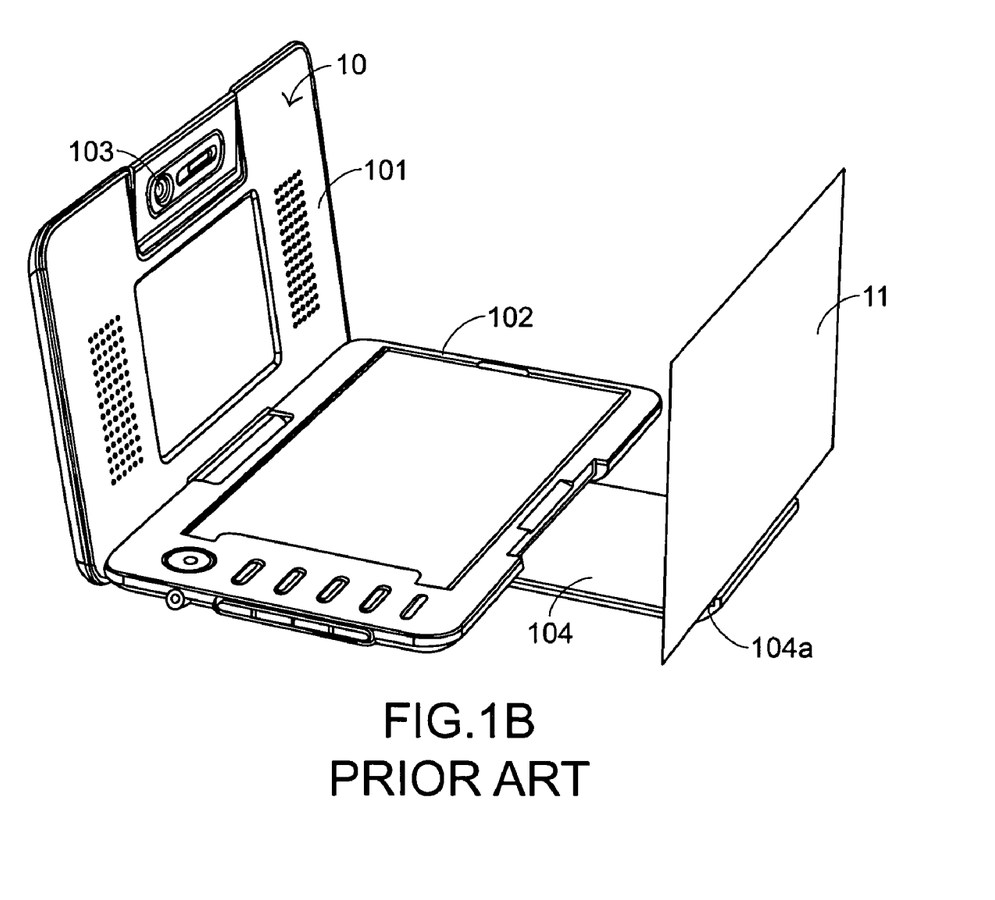
FIG. 1B is a schematic perspective view illustrating the electronic device of FIG. 1A, in which the business card holder is withdrawn from the electronic device.

FIG. 1A is a schematic perspective view illustrating an electronic device having a business card holder according to the prior art, in which the business card holder is stored within the electronic device. FIG. 1B is a schematic perspective view illustrating the electronic device of FIG. 1A, in which the business card holder is withdrawn from the electronic device. An example of the electronic device 10 of FIGS. 1A and 1B is a notebook computer. The notebook computer 10 principally comprises a screen casing 101 and a host casing 102. A web camera 103 is arranged on an upper edge of the screen casing 101. The business card holder 104 is integrated into the host casing 102 and storable within the host casing 102 (as shown in FIG. 1A). For shooting a selected area of a business card 11 by the web camera 103, the business card holder 104 is firstly withdrawn from the host casing 102 (as shown in FIG. B) and then the business card 11 is placed in an elongate recess 104a of the business card holder 104. After the relative spatial correlation (i.e. the focal length) between the web camera 103 and the business card 11 is properly adjusted, the image of the business card 11 can be captured by the web camera 103.

Figure 2:
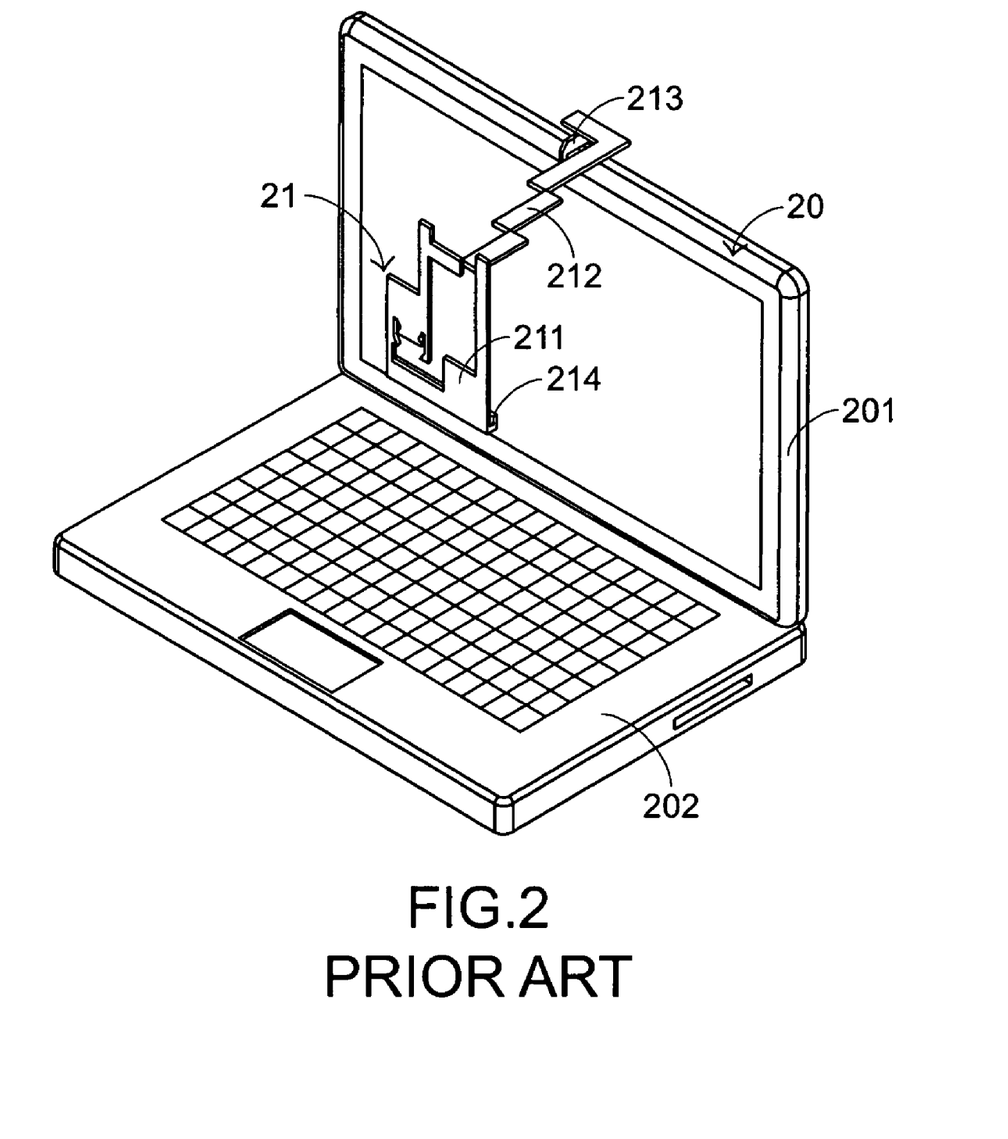
FIG. 2 is a schematic perspective view illustrating another conventional business card holder for use in an electronic device.

FIG. 2 is a schematic perspective view illustrating another conventional business card holder for use in an electronic device. The electronic device is for example a notebook computer. The business card holder 21 of FIG. 2 is externally attached onto an upper edge of the notebook computer. The business card holder 21 principally comprises a holder body 211, multiple extension arms 212, a fixing element 213 and a business card fixing recess 214. These extension arms 212 are selectively folded or unfolded with respect to the holder body 211. Depending on the desired shooting distances, the overall extended lengths of the extension arms 212 are adjustable. As shown in FIG. 2, the extension arms 212 are all unfolded to have a maximum extended length.

Through the fixing element 213, the business card holder 21 is hung on the upper edge of a screen casing 201 of the electronic device 20 (e.g. a notebook computer). Due to the fixing force and the supporting force respectively provided by the fixing element 213 and the extension arms 212, the holder body 211 is substantially maintained in parallel with the screen casing 201 of the notebook computer 20. As a consequence, a shooting angle is defined between the holder body 211 and a web camera (not shown) that is arranged on the upper edge of the screen casing 201. After a business card (not shown) is placed in the business card fixing recess 214, the image of the business card can be captured by the web camera.

In the above discussions, these two conventional business card holders are cooperated with built-in web cameras of the notebook computer. Until now, the document holder for use with a self-contained portable camera device to hold the document has not yet been disclosed. Therefore, there is a need of providing a novel document holder for use with a self-contained portable camera device.

SUMMARY OF THE INVENTION

The present invention provides a portable camera device having a document holder for holding the document to be shot.

In accordance with an aspect of the present invention, there is provided a portable camera device. The portable camera device includes a first casing, a second casing and an extendable mechanism. The second casing contains a lens module and has a lower part connected to a first connecting position of the first casing such that the lens module is arranged above the first casing. The extendable mechanism has a rear end with a document holding structure for holding a document and a front end connected to a second connecting position of the first casing via a first pivotal mechanism. The extendable mechanism is selectively folded or unfolded with respect to the first casing when the extendable mechanism is rotated in various directions by adjusting the first pivotal mechanism. A relative spatial correlation between the lens module and the document is adjusted such that the lens module is focused on a selected area of the document for capturing an image of the document.

In an embodiment, the portable camera device is a web camera, the first casing is a base, and the second casing is a camera casing containing the lens module therein.

In an embodiment, an opening is formed in an upright surface of the camera casing for exposing the lens module. The upright surface is disposed adjacent to the lower part of the camera casing. The lens module is an optical element containing an optical mechanism. The first and second connecting positions are front and rear sides of the base, respectively.

In an embodiment, the lower part of the camera casing is fixed on the front side of the base. The extendable mechanism includes a first extension plate and a second extension plate. The first extension plate has a front end pivotally coupled with the rear side of the base via a first pivotal mechanism. The second extension plate is pivotally coupled with a rear end of the first extension plate via a second pivotal mechanism. The document holding structure is arranged at a rear end of the second extension plate.

In an embodiment, the various directions include an anti-clockwise direction and a clockwise direction. The first extension plate is respectively folded and unfolded with respect to the base when the first extension plate is rotated in the anti-clockwise direction and the clockwise direction. The second extension plate is respectively folded and unfolded with respect to the first extension plate and/or the base when the second extension plate is rotated in the anti-clockwise direction and the clockwise direction.

In an embodiment, a receiving portion is further formed in a bottom surface of the second extension plate. The lens module is permitted to be partially accommodated within the receiving portion when the lens module is protruded outside the opening and the extendable mechanism is folded toward the camera casing.

In an embodiment, each of the first and second pivotal mechanisms comprises a protrusion block, a notch received in the protrusion block, bolt holes formed in sidewalls of the protrusion block and the notch, and a pivot pin penetrating through the bolt holes.

In an embodiment, the extendable mechanism further comprises a third extension plate movably mounted in the second extension plate via a gliding mechanism. The gliding mechanism includes two guide slots formed in bilateral inner walls of a receptacle of the second extension plate, and two guide tracks mating with the two guide slots and formed on bilateral sides of the third extension plate. An additional document holding structure is formed at a rear end of the third extension plate.

In an embodiment, the camera casing is pivotally connected to the front side of the base via a third pivotal mechanism, the extendable mechanism includes an extension plate having a front end pivotally coupled with the rear side of the base via the first pivotal mechanism, and the document holding structure is arranged at a rear end of the extension plate.

In an embodiment, the various directions include an anti-clockwise direction and a clockwise direction. The extension plate is respectively folded and unfolded with respect to the base when the extension plate is rotated in the anti-clockwise direction and the clockwise direction.

In an embodiment, each of the first and second pivotal mechanisms comprises a protrusion block, a notch received in the protrusion block, bolt holes formed in sidewalls of the protrusion block and the notch, and a pivot pin penetrating through the bolt holes.

In an embodiment, a receiving portion is further formed in a bottom surface of the second extension plate. The lens module is permitted to be partially accommodated within the receiving portion when the lens module is protruded outside the opening and the extendable mechanism is folded toward the camera casing.

In an embodiment, the document holding structure includes an elongate recess whose width is slightly larger than the thickness of the document.

In accordance with another aspect of the present invention, there is provided a portable camera device. The portable camera device includes a base, a camera casing, an extendable mechanism and a first pivotal mechanism. The camera casing contains a lens module and has a lower part connected to a first connecting position of the base such that the lens module is arranged above the base. The extendable mechanism has a rear end with a document holding structure for holding a document. The first pivotal mechanism is arranged between a front end of the extendable mechanism and a second connecting position of the base. The extendable mechanism is selectively folded or unfolded with respect to the base when the extendable mechanism is rotated in various directions by adjusting the first pivotal mechanism. A relative spatial correlation between the lens module and the document is adjusted such that the lens module is focused on a selected area of the document for capturing an image of the document.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

It is to be noted that the following descriptions of preferred embodiments of this invention are presented herein for purpose of illustration and description only. It is not intended to be exhaustive or to be limited to the precise form disclosed.

Figure 3A:
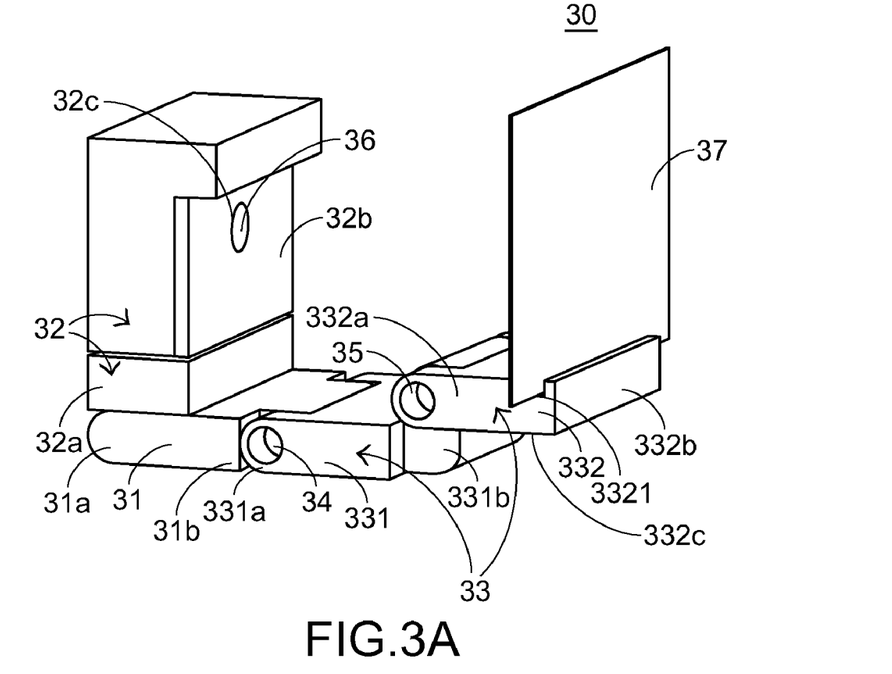
FIG. 3A is a schematic perspective view of a portable camera device according to a first preferred embodiment of the present invention.
Figure 3B:
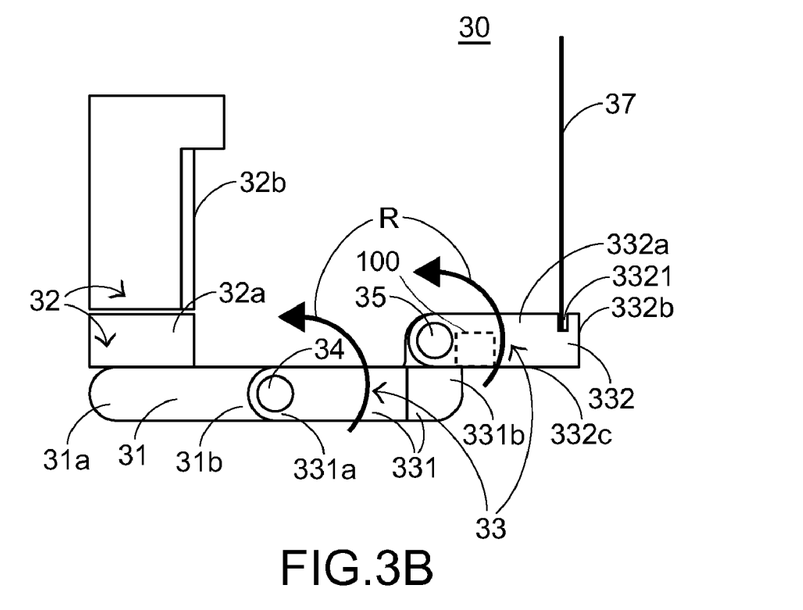
FIG. 3B is a schematic side view of the portable camera device shown in FIG. 3A.

FIGS. 3A and 3B are respectively schematic perspective and side views of a portable camera device according to a first preferred embodiment of the present invention. As shown in FIGS. 3A and 3B, the portable camera device 30 is a portable web camera. The portable camera device 30 comprises a base 31, a camera casing 32 and an extendable mechanism 33. In this embodiment, the extendable mechanism 33 comprises a first extension plate 331 and a second extension plate 332.

The front end 331a of the first extension plate 331 is pivotally coupled with the rear side 31b of the base 31 via a pivotal mechanism 34. The rear end 331b of the first extension plate 331 is pivotally coupled with the front end 332a of the second extension plate 332 via another pivotal mechanism 35. In an embodiment, when the first extension plate 331 is rotated in an anti-clockwise direction and a clockwise direction, the first extension plate 331 is respectively folded and unfolded with respect to the base 31. Similarly, when the second extension plate 332 is rotated in an anti-clockwise direction and a clockwise direction, the second extension plate 332 is respectively folded and unfolded with respect to the first extension plate 331 and/or the base 31.

For example, as shown in FIG. 3B, when the first extension plate 331 and the second extension plate 332 are rotated in anti-clockwise directions R, the first extension plate 331 and the second extension plate 332 are folded with respect to the base 31.

Each of the pivotal mechanisms 34 and 35 comprises a protrusion block, a notch received in the protrusion block, bolt holes formed in sidewalls of the protrusion block and the notch, and a pivot pin penetrating through the bolt holes. The configurations of the pivotal mechanisms 34 and 35 are known in the art, and are not redundantly describe herein.

The rotational directions of the first extension plate 331 and the second extension plate 332 with respect to each other or the base 31, and the configurations of the pivotal mechanisms 34 and 35 may be modified or alerted while retaining the teachings of the invention.

Please refer to FIGS. 3A and 3B again. The camera casing 32 has a lower part 32a. The camera casing 32 also has an upright surface 32b, which is connected to the lower part 32a. An opening 32c is formed in the upright surface 32b for exposing a lens module 36 of the portable web camera 30. In the camera casing 32, the lens module 31 is the only optical element that contains an optical mechanism. In this embodiment, the lower part 32a of the camera casing 32 is fixed on the front side 31a of the base 31 such that the lens module 36 is fixed above the base 31.

Furthermore, a document holding structure 3321 is formed at the rear end 332b of the second extension plate 332. In this embodiment, the document holding structure 3321 is an elongate recess. The width of the elongate recess 3321 is slightly larger than the thickness of a document (e.g. a business card) 37 to be shot by the lens module 36. By properly adjusting the relative spatial correlation between the extendable mechanism 33, the base 31 and the camera casing 32, the lens module 36 is focused on the selected area of the document 37 for capturing an image of the document 37.

In some embodiments, a receiving portion 100 shown in dashed lines in FIG. 3B) is formed in a bottom surface 332c of the second extension plate 332. When the lens module 36 is protruded outside the opening 32c and the extendable mechanism 33 is folded toward the camera casing 32 (that is, the first extension plate 331 and the second extension plate 332 are rotated in the anti-clockwise directions to be leant against the camera casing 32), the lens module 36 protruded outside the opening 32c will be accommodated within the receiving portion.

Figure 4A:
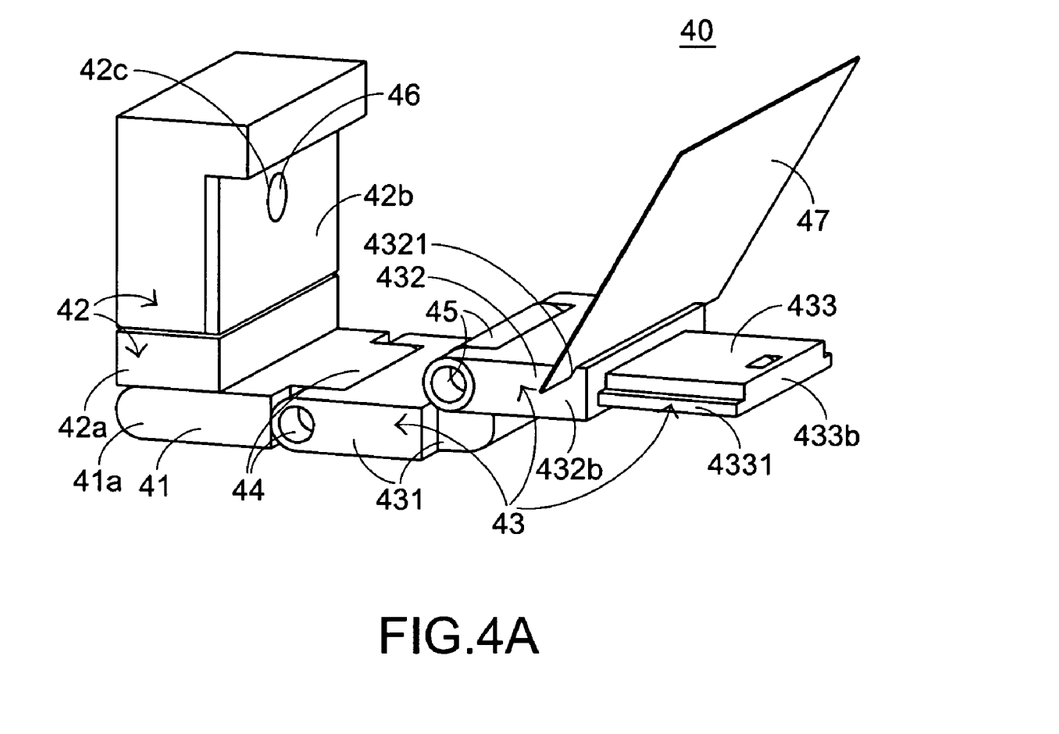
FIG. 4A is a schematic perspective view of a portable camera device according to a second preferred embodiment of the present invention.
Figure 4B:
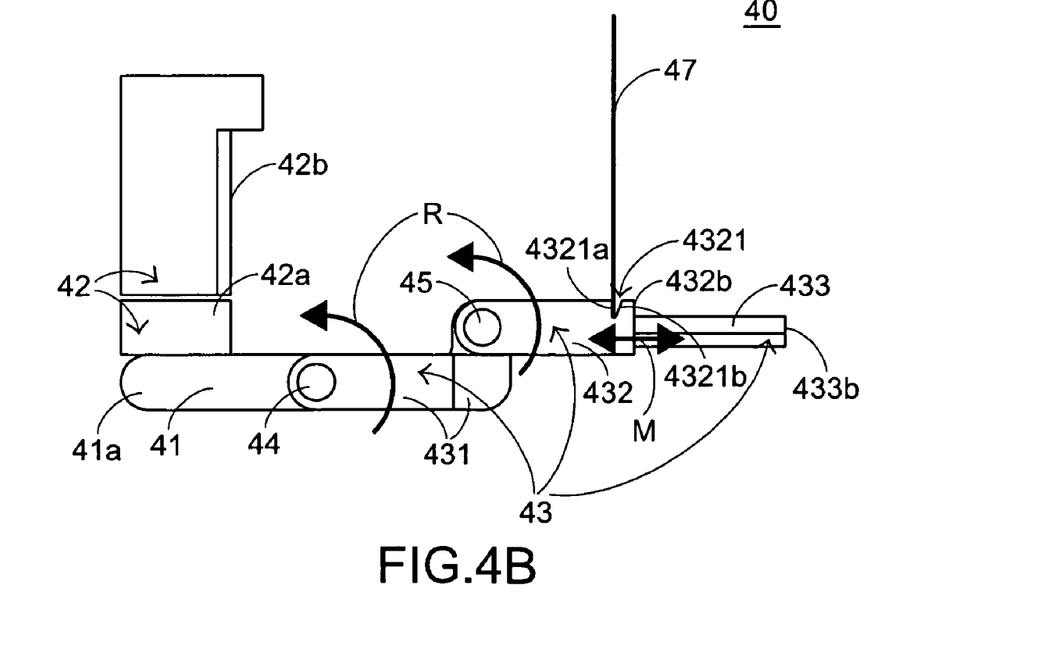
FIG. 4B is a schematic side view of the portable camera device shown in FIG. 4A.
Figure 4C:
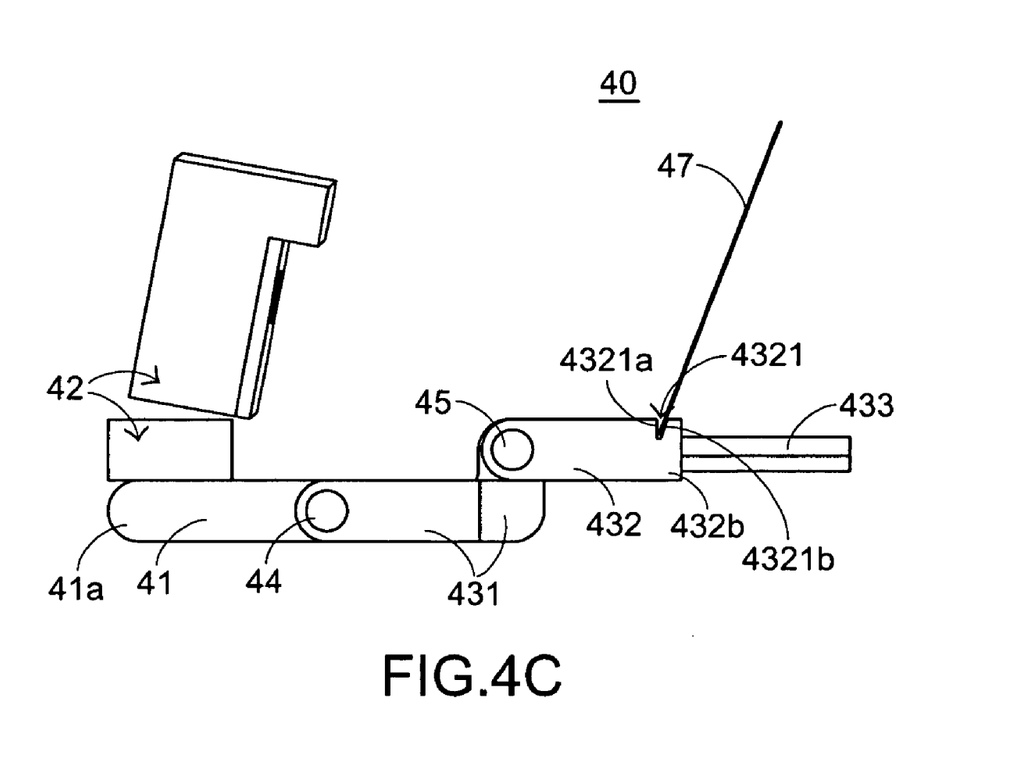
FIG. 4C schematically illustrates another side view of the portable camera device according to the second preferred embodiment of the present invention.

FIGS. 4A and 4B are respectively schematic perspective and side views of a portable camera device according to a second preferred embodiment of the present invention. FIG. 4C schematically illustrates another side view of the portable camera device according to the second preferred embodiment of the present invention.

The portable camera device 40 as shown in FIGS. 4A, 4B and 4C is a portable web camera. The portable web camera 40 comprises a base 41, a camera casing 42, an extendable mechanism 43, a first pivotal mechanism 44 and a second pivotal mechanism 45. In this embodiment, the extendable mechanism 43 comprises a first extension plate 431, a second extension plate 432 and a third extension plate 433, which are serially connected to each other.

The configurations and the operations of the base 41, the camera casing 42, the first pivotal mechanism 44 and the second pivotal mechanism 45 included in the portable camera device 40 of FIGS. 4A, 4B and 4C are identical to those of the portable camera device 30 of FIGS. 3A and 3B, and are not redundantly described herein. In contrast, the third extension plate 433 of the extendable mechanism 43 is movably mounted in the second extension plate 432. The second extension plate 432 has a receptacle (not shown) therein. Two guide slots (not shown) are formed in bilateral inner walls of the receptacle. In addition, two guide tracks 4331 mating with these two guide slots are formed on bilateral sides of the third extension plate 433. After the guide tracks 4331 are mounted in the guide slots, the third extension plate 433 can be selectively stored in or withdrawn from the receptacle of the second extension plate 432. In this context, the two guide slots and the two guide tracks are also collectively defined as a gliding mechanism.

In some embodiments, another document holding structure (not shown), for example also an elongate recess, may be formed at the rear end 433b of the third extension plate 433 for placing therein the document 47 to be shot. Under this circumstance, the third extension plate 433 can be moved forwardly or backwardly in a horizontal direction M so as to adjust the focal length between the lens module 46 and the document 47. The operations of moving the third extension plate 433 are apparent to those skilled in the art, and are not redundantly described herein.

Moreover, the document holding structure 4321 that is formed at the rear end 432b of the second extension plate 432 can be an elongate recess having a vertical surface 4321a and a slant surface 4321b. When the document 47 is leant against the vertical surface 4321a (as shown in FIG. 4B), the camera casing 42 that contains the lens module 46 is substantially parallel with the document 47. Whereas, when the document 47 is leant against the slant surface 4321b (as shown in FIG. 4C), the camera casing 42 can be also tilted such that the camera casing 42 is parallel with the document 47.

Figure 5A:
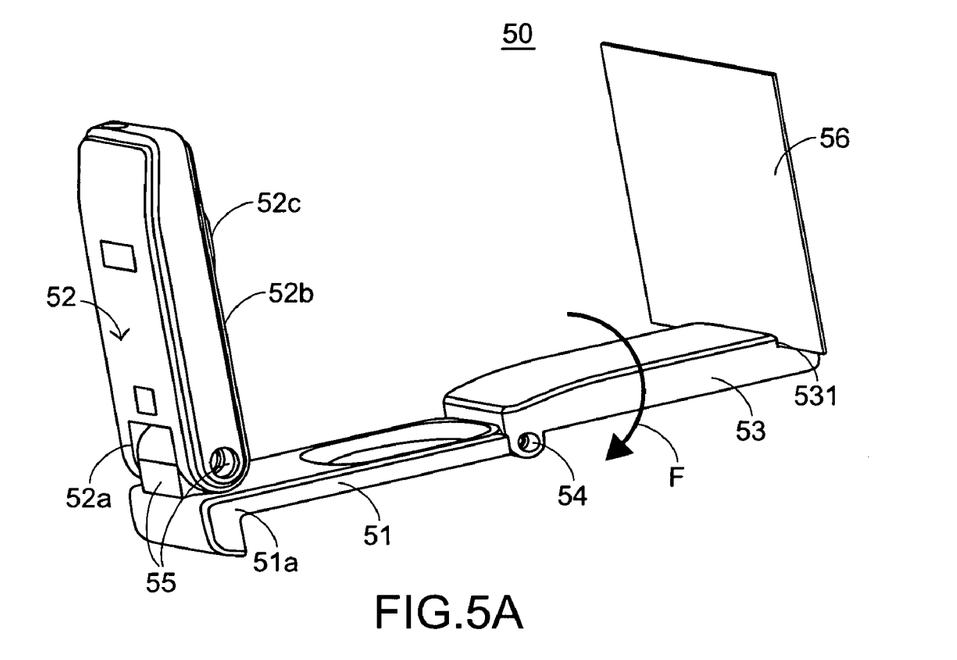
FIGS. 5A and 5B are respectively schematic perspective and side views of a portable camera device according to a third preferred embodiment of the present invention.
Figure 5B:
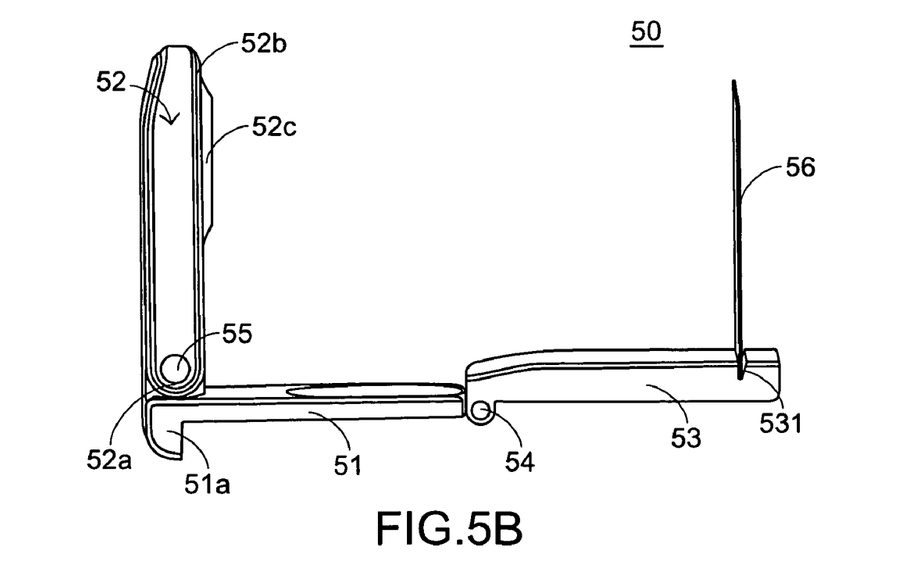

FIGS. 5A and 5B are respectively schematic perspective and side views of a portable camera device according to a third preferred embodiment of the present invention.

The portable camera device 50 as shown in FIGS. 5A and 5B is for example a portable web camera. The portable web camera 50 comprises a base 51, a camera casing 52, an extendable mechanism 53, a first pivotal mechanism 54 and a third pivotal mechanism 55. The camera casing 52 has a lower part 52a. The camera casing 52 also has an upright surface 52b, which is connected to the lower part 52a. An opening 52c is formed in the upright surface 52b for exposing a lens module 56 of the portable web camera 50.

The configurations and the operations of the base 51, the camera casing 52 and the first pivotal mechanism 54 included in the portable camera device 50 of FIGS. 5A and 5B are identical to those of the portable camera device 30 of FIGS. 3A and 3B, and are not redundantly described herein. In contrast, the extendable mechanism 53 includes only one extension plate, which is pivotally connected to the base 51 via the first pivotal mechanism 54. When the extension plate 53 is rotated in the anti-clockwise direction F, the extension plate 53 is folded with respect to the base 51. In addition, a document holding structure 531 (e.g. an elongate recess) is formed at the rear end of the extension plate 53 for placing therein the document 56 to be shot therein.

Moreover, the camera casing 52 is pivotally connected to the front side 52a of the base 51 via the third pivotal mechanism 55 such that an included angle between the camera casing 52 and the base 51 is adjustable.

From the above description, the portable camera device of the present invention has a document holder for holding the document to be shot. The document holder is effective to hold the document steady during the shooting process.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A portable camera device comprising:
   a first casing, wherein said first casing is a base;
   a second casing containing a lens module and having a lower part connected to a first connecting position of said first casing such that said lens module is arranged above said first casing, wherein said second casing is a camera casing containing said lens module therein, wherein an opening is formed in an upright surface of said camera casing for exposing said lens module, wherein said upright surface is disposed adjacent to said lower part of said camera casing, said lens module is an optical element containing an optical mechanism; and
   an extendable mechanism having a rear end with a document holding structure for holding an edge of a document and allowing the document to extend away from the holding structure at a non-parallel angle relative to the extendable mechanism, and a front end connected to a second connecting position of said base via a first pivotal mechanism, wherein said first and second connecting positions are respectively front and rear sides of said base, wherein said extendable mechanism is selectively folded or unfolded with respect to said base when said extendable mechanism is rotated in various directions by adjusting said first pivotal mechanism, and a relative spatial correlation, including focal length and angle between said lens module and said document is user-adjustable such that said lens module is focused on a selected area of said document for capturing an image of said document, wherein said lower part of said camera casing is fixed on said front side of said base, and said extendable mechanism comprises:

a first extension plate having a front end pivotally coupled with said rear side of said base via a first pivotal mechanism; and a second extension plate pivotally coupled with a rear end of said first extension plate via a second pivotal mechanism, wherein said document holding structure is arranged at a rear end of said second extension plate.

2. The portable camera device according to claim 1 wherein said portable camera device is a web camera.

3. The portable camera device according to claim 1 wherein said various directions include an anti-clockwise direction and a clockwise direction, said first extension plate is respectively folded and unfolded with respect to said base when said first extension plate is rotated in said anti-clockwise direction and said clockwise direction, and said second extension plate is respectively folded and unfolded with respect to said first extension plate and/or said base when said second extension plate is rotated in said anti-clockwise direction and said clockwise direction.

4. The portable camera device according to claim 1 wherein a receiving portion is further formed in a bottom surface of said second extension plate, and said lens module is permitted to be partially accommodated within said receiving portion when said lens module is protruded outside said opening and said extendable mechanism is folded toward said camera casing.

5. The portable camera device according to claim 1 wherein each of said first and second pivotal mechanisms comprises a protrusion block, a notch received in said protrusion block, bolt holes formed in sidewalls of said protrusion block and said notch, and a pivot pin penetrating through said bolt holes.

6. The portable camera device according to claim 1 wherein said extendable mechanism further comprises a third extension plate movably mounted in said second extension plate via a gliding mechanism, said gliding mechanism comprises two guide slots formed in bilateral inner walls of a receptacle of said second extension plate and two guide tracks mating with said two guide slots and formed on bilateral sides of said third extension plate, and an additional document holding structure is formed at a rear end of said third extension plate.

7. The portable camera device according to claim 1 wherein said camera casing is pivotally connected to said front side of said base via a third pivotal mechanism, said extendable mechanism includes an extension plate having a front end pivotally coupled with said rear side of said base via said first pivotal mechanism, and said document holding structure is arranged at a rear end of said extension plate.

8. The portable camera device according to claim 7 wherein said various directions include an anti-clockwise direction and a clockwise direction, and said extension plate is respectively folded and unfolded with respect to said base when said extension plate is rotated in said anti-clockwise direction and said clockwise direction.

9. The portable camera device according to claim 7 wherein each of said first and second pivotal mechanisms comprises a protrusion block, a notch received in said protrusion block, bolt holes formed in sidewalls of said protrusion block and said notch, and a pivot pin penetrating through said bolt holes.

10. The portable camera device according to claim 7 wherein a receiving portion is further formed in a bottom surface of said second extension plate, and said lens module is permitted to be partially accommodated within said receiving portion when said lens module is protruded outside said opening and said extendable mechanism is folded toward said camera casing.

11. The portable camera device according to claim 1 wherein said document holding structure includes an elongate recess whose width is slightly larger than the thickness of said document.

12. A portable camera device comprising:

a base;

a camera casing containing a lens module and having a lower part that is disposed on and connected to a first connecting position on said base such that said lens module is arranged above said base, wherein an opening is formed in an upright surface of said camera casing for exposing said lens module, wherein said upright surface is disposed adjacent to said lower part of said camera casing, said lens module is an optical element containing an optical mechanism;

an extendable mechanism having a rear end with a document holding structure for holding an edge of a document and allowing the document to extend away from the holding structure at a non-parallel angle relative to the extendable mechanism; and a first pivotal mechanism arranged between a front end of said extendable mechanism and a second connecting position of said base, wherein said first and second connecting positions are respectively front and rear sides of said base, wherein said extendable mechanism is selectively folded or unfolded with respect to said base when said extendable mechanism is rotated in various directions by adjusting said first pivotal mechanism, and a relative spatial correlation, including focal length and angle between said lens module and said document is user-adjustable such that said lens module is focused on a selected area of said document for capturing an image of said document, wherein said lower part of said camera casing is fixed on or pivotally connected with said front side of said base, and said extendable mechanism comprises multiple serially-connected extension plates comprising:

a first extension plate having a front end pivotally coupled with said rear side of said base via a first pivotal mechanism; and a second extension plate pivotally coupled with a rear end of said first extension plate via a second pivotal mechanism, wherein said document holding structure is arranged at a rear end of said second extension plate.

13. The portable camera device according to claim 12 wherein said portable camera device is a web camera.

14. The portable camera device according to claim 12 wherein said extendable mechanism includes a gliding mechanism, which is movably connected to a specified extension plate of said serially-connected multiple extension plates.

15. The portable camera device according to claim 12 wherein said various directions include a first rotating direction and a second rotating direction, which are respectively an anti-clockwise direction and a clockwise direction.

16. The portable camera device according to claim 12 wherein said first pivotal mechanism comprises a protrusion block, a notch received in said protrusion block, bolt holes formed in sidewalls of said protrusion block and said notch, and a pivot pin penetrating through said bolt holes.

17. The portable camera device according to claim 12 wherein said document holding structure includes an elongate recess whose width is slightly larger than the thickness of said document.

* * * * *